(12) United States Patent
Harrison et al.

(10) Patent No.: US 11,136,267 B2
(45) Date of Patent: *Oct. 5, 2021

(54) GYPSUM PANELS, METHODS, AND SYSTEMS

(71) Applicant: Georgia-Pacific Gypsum LLC, Atlanta, GA (US)

(72) Inventors: Charles R. Harrison, Acworth, GA (US); Stuart Brandon Gilley, Atlanta, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/587,890

(22) Filed: Sep. 30, 2019

(65) Prior Publication Data

US 2020/0087209 A1    Mar. 19, 2020

Related U.S. Application Data

(63) Continuation of application No. 16/047,108, filed on Jul. 27, 2018, now Pat. No. 10,427,979.

(60) Provisional application No. 62/638,550, filed on Mar. 5, 2018.

(51) Int. Cl.
| | |
|---|---|
| *C04B 28/14* | (2006.01) |
| *C04B 14/18* | (2006.01) |
| *B32B 13/08* | (2006.01) |
| *C04B 14/30* | (2006.01) |
| *C04B 103/00* | (2006.01) |
| *C04B 111/00* | (2006.01) |
| *E04C 2/04* | (2006.01) |

(52) U.S. Cl.
CPC .............. *C04B 28/14* (2013.01); *B32B 13/08* (2013.01); *C04B 14/18* (2013.01); *C04B 14/303* (2013.01); *C04B 28/144* (2013.01); *B32B 2607/00* (2013.01); *C04B 2103/0078* (2013.01); *C04B 2111/0062* (2013.01); *E04C 2/043* (2013.01)

(58) Field of Classification Search
None
See application file for complete search history.

(56) References Cited

U.S. PATENT DOCUMENTS

| | | | |
|---|---|---|---|
| 2,856,304 | A | 10/1958 | Kirk |
| 3,616,173 | A | 10/1971 | Green et al. |
| 5,305,577 | A | 4/1994 | Richards |
| 6,746,781 | B2 | 6/2004 | Francis et al. |
| 7,731,794 | B2 | 6/2010 | Yu et al. |
| 10,427,979 | B2 * | 10/2019 | Harrison ................ B32B 13/08 |
| 2003/0138614 | A1 | 7/2003 | Leclercq |
| 2007/0059513 | A1 | 3/2007 | Yu et al. |
| 2008/0070026 | A1 | 3/2008 | Yu et al. |
| 2008/0299413 | A1 | 12/2008 | Song et al. |
| 2010/0075167 | A1 | 3/2010 | Gilley et al. |
| 2012/0214887 | A1 | 8/2012 | Stay et al. |
| 2012/0237756 | A1 | 9/2012 | Lee et al. |
| 2014/0315008 | A1 | 10/2014 | Francis |

OTHER PUBLICATIONS

International Search Report and Written Opinion, PCT/US2019/017346 dated May 15, 2019.

* cited by examiner

*Primary Examiner* — Sheeba Ahmed

(57) ABSTRACT

Gypsum panels and methods of making gypsum panels are provided. A method of making a gypsum panel includes combining gypsum stucco and a halide salt sequestration agent with water to form a gypsum slurry and setting the gypsum slurry to form at least a portion of a gypsum core, wherein the halide salt sequestration agent is present in an amount effective to sequester at least a portion of halide salt present in the gypsum stucco. A gypsum panel includes a gypsum core that comprises set gypsum and a halide salt sequestration agent, wherein the halide sequestration agent sequesters at least a portion of halide salt present in the gypsum core.

17 Claims, 10 Drawing Sheets

GYPSUM PANELS, METHODS, AND SYSTEMS

CROSS-REFERENCE TO RELATED APPLICATIONS

This application is a continuation of U.S. patent application Ser. No. 16/047,108, filed on Jul. 27, 2018, which claims the benefit of U.S. Provisional Patent Application Ser. No. 62/638,550, filed Mar. 5, 2018, each of which are incorporated herein by reference in their entirety.

BACKGROUND

The present disclosure generally relates to gypsum panels and methods of manufacturing gypsum panels, and particularly relates to gypsum panels in which the impact of salt within the gypsum material has been mitigated.

Panels having a core of set gypsum have long been used as structural elements in the fabrication of buildings. Such panels, also commonly known as "wallboard," "drywall," or "plasterboard," are typically used to form the partitions or walls of rooms, elevator shafts, stairwells, ceilings and the like and represent a less costly and more expeditious alternative to conventional plaster walls.

In its most common form, gypsum wallboard is produced by sandwiching a solid gypsum core made from an aqueous slurry of calcined gypsum, usually a slurry of calcium sulfate hemihydrate, between two sheets of a facing material, typically heavy papers or fibrous mats, such as fiberglass. Gypsum wallboard is manufactured continuously at a high speed by continuously depositing the aqueous slurry of calcined gypsum and other ingredients onto one of the two facing sheets and then bringing the second facing sheet into contact with the free surface of the gypsum slurry to form a sandwich-like structure.

The calcined gypsum slurry deposited between the two facing sheets sets (i.e., the calcined gypsum reacts with water from the aqueous slurry) to form a rigid board-like structure. The so-formed board then is cut into panels of a desired length (for example, eight to sixteen feet). If the so-formed board contains excess water (water is necessary not only for hydrating the calcined gypsum but also to ensure sufficient fluidity of the gypsum slurry during preparation of the board), the board may then pass through a drying kiln in which excess water is removed and the gypsum wallboard is brought to a final hydrated, but dry state. After the core has been set and is fully dried, the sandwich becomes a rigid, fire-resistant building material.

However, it would be desirable to produce gypsum panels having improved strength and/or an improved bond between the gypsum core and the panel facer material.

SUMMARY

In one aspect, a method of making a gypsum panel is provided, including combining gypsum stucco and a halide salt sequestration agent with water to form a gypsum slurry, and setting the gypsum slurry to form at least a portion of a gypsum core, wherein the halide salt sequestration agent is present in an amount effective to sequester at least a portion of halide salt present in the gypsum stucco.

In another aspect, a gypsum panel is provided, including a gypsum core that contains set gypsum and a halide salt sequestration agent, wherein the halide sequestration agent sequesters at least a portion of halide salt present in the gypsum core.

In yet another aspect, sheathing systems are provided, including at least two of the gypsum panels described herein.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

DETAILED DESCRIPTION

Figure 1:
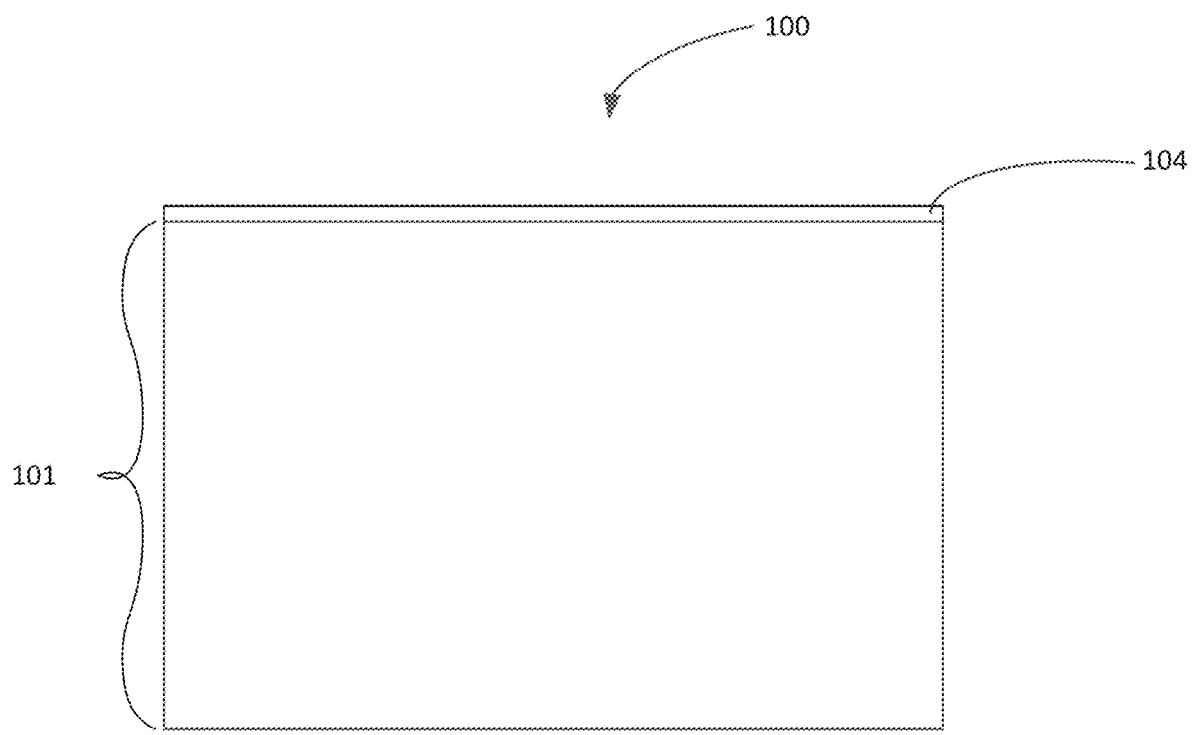
FIG. 1 is a cross-sectional view of a gypsum panel having a paper material facer

Gypsum panels and systems of panels, and methods for their manufacture, are provided herein. The panels display improved strength and/or an improved bond between the gypsum core and the panel facer material. In particular, the panels may display a relatively high bond strength between the gypsum core and a paper facer material.

The raw gypsum used to create gypsum panels is obtained from various natural sources as well as from flue gas desulfurization (FGD) (also known as byproduct or synthetic gypsum), which is obtained from electric utilities. As such, the chemical composition of the gypsum may vary significantly between sources. These differences in the chemical composition have been discovered to result in differences in resulting panel performance, including strength and bond between the core and the facer material. In particular, it has been discovered that the presence of salt in the gypsum may negatively affect panel performance in these areas. The present disclosure is directed at methods for mitigating the impact of salt on these performance characteristics. In particular, this disclosure is directed to methods for making gypsum panels by combining a halide salt sequestration agent with the gypsum stucco, in an amount effective to sequester at least a portion of any salt present in the gypsum stucco, as well as panels and systems of panels produced by these methods.

Methods of making gypsum panels, and the resulting panels, will be described in detail. It should be understood that although features of the disclosure may be described with reference to particular embodiments, the disclosure is meant to encompass any number of variations, alterations, substitutions, or equivalent arrangements not explicitly described herein, and should not be limited to such explicitly disclosed embodiments.

Methods of Making Gypsum Panels

In one aspect, methods of making gypsum panels to mitigate the impact of salt present in the gypsum stucco are provided. In certain embodiments, these methods include combining gypsum stucco and a halide salt sequestration agent with water to form a gypsum slurry, and setting the gypsum slurry to form at least a portion of a gypsum core, wherein the halide salt sequestration agent is present in an amount effective to sequester at least a portion of halide salt present in the gypsum stucco. These methods may be used to produce gypsum panels having any of the features, or combinations of features, described herein.

As used herein the phrase "halide salt sequestration agent" refers to a material that is effective to capture or bind to a halide ion (e.g., chloride, fluoride, bromide) of a halide salt, to render it inactive. For example, halide salts may include sodium chloride (NaCl), calcium chloride ($CaCl_2$), potassium chloride (KCl), potassium iodide (KI), lithium chloride (LiCl), copper(II) chloride ($CuCl_2$), silver chloride (AgCl). For example, the halide salt sequestration agent may act to sequester the halide ion through any suitable mechanism. In certain embodiments, the halide salt sequestration agent has a porous surface that provides increased surface area to capture the halide salt.

As used herein, the phrase "in an amount effective to sequester at least a portion of halide salt present in the gypsum stucco" refers to the agent rendering inactive at least some portion of the halide ions present in the gypsum stucco, if any are present. For example, the halide salt sequestration agent may be provided in an amount effective to sequester at least 25 percent, by weight, of the halide salts present in the gypsum stucco. For example, the halide salt sequestration agent may be provided in an amount effective to sequester at least 50 percent, by weight, at least 75 percent, by weight, at least 90 percent, by weight, or at least 95 percent, by weight, of the halide salts present in the gypsum stucco.

In certain embodiments, the halide sequestration agent is alumina (i.e., aluminum oxide), perlite (amorphous volcanic glass containing silicon oxide and/or aluminum oxide, among other compounds), or a combination thereof. Other suitable materials that are effective at sequestering halide ions may also be used. For example, the alumina may be activated alumina, which is manufactured from aluminum hydroxide by dehydroxylating it in a way that produces a highly porous material with a relatively high surface area to weight ratio. For example, the alumina may have a surface area of about 200 $m^2/g$ or greater, such as of about 300 $m^2/g$ or greater.

In certain embodiments, the halide salt sequestration agent includes activated alumina present in an amount of from about 0.01 to about 10 weight percent, by weight of the gypsum stucco. In some embodiments, the activated alumina is present in an amount of from about 0.01 to about 3 weight percent, by weight of the gypsum stucco. The alumina may have a relatively small particle size, so as to increase the available surface area of the agent for a given mass of material. For example, the alumina may have an average particle size of less than about 5 mm, such as less than about 4 mm, less than about 2 mm, or less than about 1 mm.

In certain embodiments, the halide sequestration agent includes perlite present in an amount in an amount of from about 0.01 to about 10 weight percent, by weight of the gypsum stucco. In some embodiments, the perlite is perlite ore. In other embodiments, the perlite is expanded perlite. For example, the perlite ore may have an average particle size of less than (i.e., a smaller particle than) 30 mesh. For example, the perlite ore may have a particle size range displaying the following screen analysis (screen size; maximum range and minimum range cumulative total percent by weight retained): (16 mesh; -/3; -/0); (20 mesh; 7/15; 0/5); (30 mesh; 35/42; 12/25); (50 mesh; 95/98; 75/80); (100 mesh; 100/100; 95/95). For example, the expanded perlite may have an average particle size of less than (i.e., a smaller particle than) about 16 mesh. For example, the expanded perlite may have a particle size range displaying the following screen analysis (screen size; cumulative total percent by weight retained): (8 mesh; 0); (16 mesh; 1-11); (20 mesh; 41-69); (30 mesh; 68-88); (50 mesh; 93-96); (100 mesh; 96-100).

In certain embodiments, methods of manufacturing these gypsum panels further include heating the halide sequestration agent (e.g., perlite, alumina, unexpanded aluminum oxide) prior to combining the halide sequestration agent with the gypsum stucco. For example, the heating is effective to expand or activate at least a portion of the halide sequestration agent. That is, the methods may include a step of forming the expanded perlite or activated alumina. Such heating may be done on or off-line with the gypsum panel formation, such as in a kiln, kettle, oven, or other suitable heating apparatus.

As in any gypsum wallboard, the largest single ingredient, other than possibly water, in the gypsum slurry is a source of calcined gypsum, usually calcium sulfate hemihydrate, commonly referred to as "stucco" or "Plaster of Paris." Generally, a wide amount of calcined gypsum can be used in preparing the gypsum slurry. The calcined gypsum typically comprises about 30 weight percent to about 60 weight percent of the gypsum slurry, such as from about 40 to 50 weight percent of the gypsum slurry. However, this disclosure is not limited to any particular source of the calcined gypsum and can use calcined gypsum made from both natural minerals extracted from quarries, and from synthetic gypsums, known as desulfogypsum, produced from the desulfurization of electrical power plant flue gas effluents (i.e., FGD gypsum). Calcined gypsum made from a combination of natural and synthetic gypsum also can be employed. Following hydration and drying, the set gypsum typically constitutes more than 85 percent, by weight, of the set gypsum core.

Whether natural rock or synthetic, the gypsum may be dried, ground, calcined, and stored as stucco, which is calcium sulfate hemihydrate. The drying step of stucco manufacture typically includes passing crude gypsum rock through a rotary kiln to remove free moisture, and then grinding the rock to a desired fineness, using for example a roller mill. The dried, ground gypsum, often referred to as "land plaster," then is typically heated in a "calciner" to remove water of hydration and yield the calcined gypsum that exhibits the valuable property of being chemically reactive with water, and setting to form a rigid structure. There are two forms of stucco, alpha (α) calcium sulfate hemihydrate and beta ((3) calcium sulfate hemihydrate. As will be appreciated by those skilled in the art, these two types of stucco are produced by different calcination procedures. The present disclosure can generally use either the beta or the alpha form of stucco; though, as is the case in conventional gypsum wallboard production, the less costly beta form is usually used.

In certain embodiments, the calcined gypsum is mixed, typically in a "pin" mixer, with the halide salt sequestration agent and any other additives, in the presence of water, to form a gypsum slurry. In some embodiments, the halide salt sequestration agent is dry mixed with the gypsum stucco; however, other processes may also be used. Thus, the aqueous gypsum slurry contains at least gypsum, water, and the halide salt sequestration agent; however, other additives will commonly be used. For example, any suitable additives known in the industry may be used. For example, suitable additives may include starches (such as regular and pregelatinized starch), agents to reduce the density of the gypsum core (such as foaming agents, surfactants, microspheres), dispersants, set retarders, set accelerators, biocides (mold and mildew control agents), fillers, water resistance additives (such as a wax or a wax emulsion or siloxanes), fire retardants, reinforcing fibers (such as chopped glass fibers or other inorganic fibers), strength-enhancing agents (such as sodium trimetaphosphate or polymeric binders) and combinations thereof.

An amount of water also is included in the gypsum slurry to ensure proper flowability of the slurry. Water is added to the process to hydrate the calcined gypsum, to provide needed fluidity. As is the case in conventional wallboard production, most of this water must eventually be driven off by heating the set gypsum wallboard. Thus, the lower the amount of water used, the lower the drying costs. In certain embodiments, the weight ratio of water to calcined gypsum can range over a wide range of weight ratios (i.e., weight of water divided by weight of calcined gypsum). In some embodiments, the water-to-calcined gypsum weight ratio (water:calcined gypsum) is established in the range of about 0.5:1, to about 1.5:1, such as from about 0.7:1 to about 1.3:1.

The gypsum slurry may be formed into a long, continuous sheet between two layers of facing material. In an alternative embodiment, the gypsum slurry may be placed in a mold.

Figure 3:
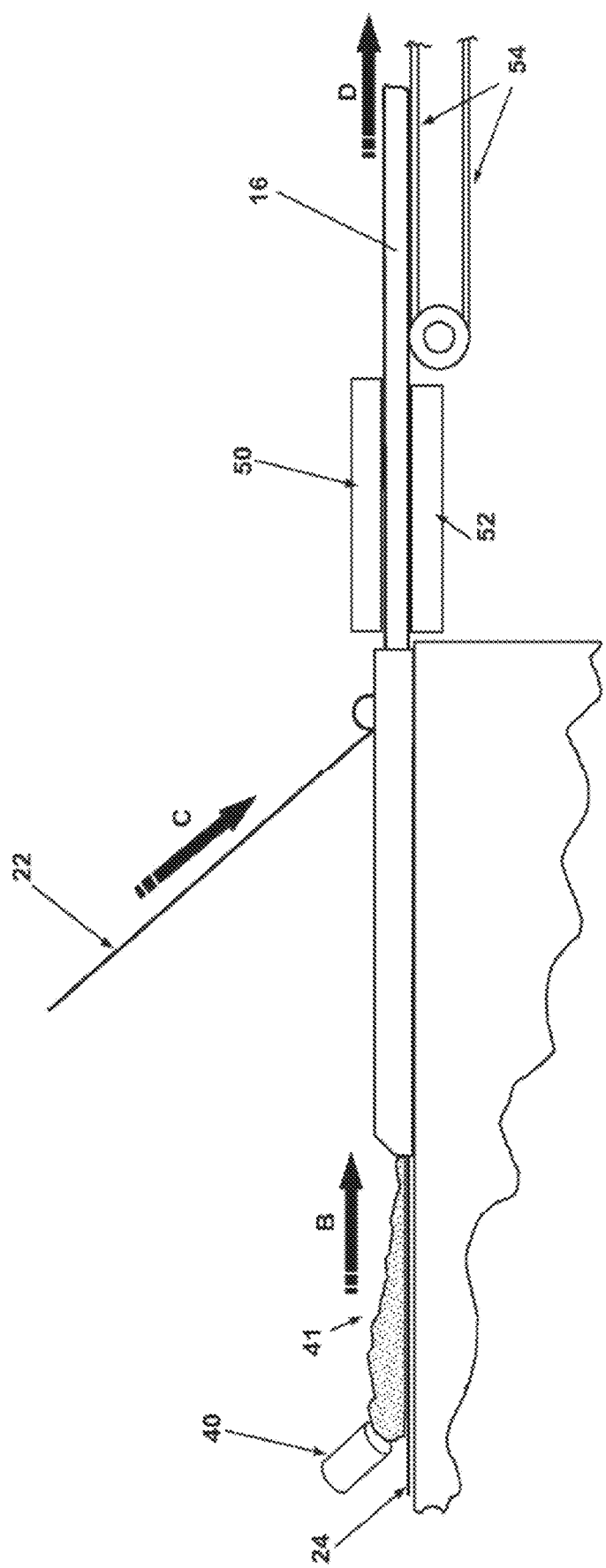
FIG. 3 is a schematic depiction of a process of producing a gypsum wallboard.

One method for preparing a wallboard in accordance with the present disclosure is illustrated schematically in FIG. 3. In this embodiment, the calcined gypsum is fed into the top of a mixer of the type commonly referred to as a pin mixer (not shown) along with other dry components. In particular, the halide salt sequestration agent and any other optionally included dry additive components from which the gypsum slurry is formed can be pre-mixed and then fed as a dry mixture to the pin mixer. Water and other liquid constituents (e.g., soap or foam, prepared separately using high shear mixing and used to control the slurry density), used in forming the gypsum slurry, are also metered into the pin mixer through other ports where they are combined with the dry components to form an aqueous gypsum slurry 41, which emerges from a discharge conduit 40 of the pin mixer. The residence time in the pin mixer usually is very short.

The slurry is deposited through one or more outlets of the discharge conduit 40 onto a continuous, horizontally moving lower facing sheet 24 comprising a facing material (e.g., paper, a fibrous web) which may be slightly wider than the desired width of the wallboard. The lower facing sheet 24 and the deposited gypsum slurry 41 move in the direction of arrow B. An upper facing sheet 22, also including a material such as paper, is fed in the direction of arrow C from a roll (not shown) and applied to the upper surface of the gypsum slurry 41. The "sandwich" of slurry and adjacent facing sheets is then passed through a mold or other forming device (rollers, guides, or plates (50 and 52)) for establishing the desired width and thickness of the gypsum board. The amount of slurry deposited can be controlled in a manner known in the art such that it, in cooperation with plates 50 and 52 and the facing sheets 22 and 24, form a board of the desired width and thickness. Facing sheets 22 and 24 are usually of a type of paper, such as multi-ply paper, commonly used for the face sheet of wallboard products, or a fibrous web, such as fiberglass, although other facing materials may be used.

The lower facing sheet 24 is fed from a roll (not shown). In some embodiments, prior to receiving the gypsum slurry 41, the lower facing sheet 24 may be scored by one or more scoring devices, allowing the edges of lower facing sheet 24 to be folded upward and around the deposited gypsum slurry. These edges may then be glued or adhered with a gypsum slurry to overlapping portions of an upper facing sheet 22 according to methods known in the art. Prior to applying the (upper) facing sheet 22 to the upper surface of the gypsum slurry, glue may be applied to the facing sheet along portions of the sheet that will overlap and be in contact with the folded-over mat edges (glue application is not shown).

In certain embodiments, the gypsum core includes multiple layers that are sequentially applied to the fiberglass mat, and allowed to set either sequentially or simultaneously. In other embodiments, the gypsum core includes a single layer. Though not shown, the present disclosure also contemplates that, in certain embodiments, a minor portion of the gypsum slurry may be discharged through an appropriate outlet to provide a relatively thin layer of gypsum slurry on the inner surface of facing sheets 22 and 24. The thin layer of gypsum slurry is somewhat denser than the aqueous slurry of gypsum used to form the main portion of the set gypsum core (main core slurry discharged through outlet 40 to form gypsum slurry layer). This higher density region of the core (also known as the "slate coat") is intended to assist in the formation of a strong bond between the lower density portion of the core and the facing sheets, such as by penetrating into the interstices of a fibrous facing material.

In some embodiments, the slurry used to form the slate coat layer is about 18 to 20 percent denser than the density of the slurry used to form the main portion of the set gypsum core. In certain embodiments, depositing the gypsum slurry includes depositing a first gypsum slurry having a wet density of from about 88 pcf to about 98 pcf onto the surface of a fiberglass mat, the first gypsum slurry. In certain embodiments, the first gypsum slurry has a wet density of from about 93 pcf to about 96 pcf. In some embodiments, the gypsum core includes at least three gypsum layers, with the outermost gypsum layers of the gypsum core (i.e., the layers that form an interface with the facer mats) being slate coat layers. In certain embodiments, both outermost layers have a relatively high density or are otherwise chemically altered for enhanced penetration. Thus, a third gypsum slurry may have a wet density of from about 88 pcf to about 98 pcf, or from about 93 pcf to about 96 pcf. In certain embodiments, the first gypsum slurry (or each of the outermost gypsum slurry layers) is deposited in an amount of from about 5 percent to about 20 percent, by weight, of the gypsum core. In addition, it also is contemplated that, in some embodiments, some of this higher density gypsum slurry also can be used to form streams of gypsum slurry at each of the edges of the facing sheets to form hard edges of the wallboard.

In the illustrated embodiment, the nascent board 16 then travels on rollers or on a conveyor 54 in the direction of arrow D for several minutes. During this time, the slurry is allowed to set and form the hardened gypsum core by hydration of the stucco. During this setting process, the core hardens as the gypsum mineral (calcium sulfate dihydrate) is formed.

Wallboard panels are then cut to length, flipped, and dried, such as in a continuous oven or by allowing the material(s) to set at room temperature (i.e., to self-harden). The individual boards may then be taped face-to-face in pairs and stacked for shipment. For molded articles, the gypsum slurry is alternatively introduced directly into a mold and the slurry sets to form the article.

As noted above, in certain embodiments, the slurry contains more water than necessary solely to reconstitute the gypsum from stucco. This extra water is used in the board forming stage to reduce the stucco slurry viscosity sufficiently to allow for its even distribution (e.g., by using a forming roll) across and between the facing sheets at a desired thickness. Because of the use of excess water, the gypsum board remains wet after hydration (although it is possible at this point the board can be cut to desired dimensions). Therefore, the formed board ultimately may be dried.

In certain embodiments, the drying operation involves applying heat by circulating hot air (e.g., in a drying oven) around the wet gypsum board to evaporate the excess water. It may be necessary, therefore, that the facing sheets be sufficiently porous to allow this excess water to readily evaporate without adverse effects such as delamination, tearing, bursting, etc. of the facing sheets. The ability of the facing sheets to allow the escape of water vapor may also promote a uniform degree of dryness. This may improve overall board quality, since insufficiently dried gypsum board presents storage problems, while over-drying leads to calcination and causes a loss of mechanical strength. Typical drying conditions may involve maintaining an ambient or surrounding hot air temperature from 200° F. to 600° F. (about 95° C. to 315° C.) for a drying time from 10 minutes to 2 hours. For example, at line speeds of about 70 to about 600 linear feet per minute, drying times of about 30 to about 60 minutes may be used. However, these parameters are exemplary and are influenced by the particular configuration of the board manufacturing line.

Conventional gypsum wallboard, at a nominal thickness of ½ inch or ⅝ inch, typically is prepared at a weight between about 1200 to 2000 pounds per 1,000 square feet (MSF) of board (about 5,900 kg to about 9,800 kg per thousand square meters). This corresponds to a board density of about 38 to about 43 lb/ft$^3$ (about 0.61 to 0.69 g/cc). The gypsum wallboards prepared in accordance with this disclosure may have such relatively high weight and densities, or may have a reduced density relative to a standard wallboard. For example, reducing the weight of each gypsum wallboard panel by as little as 30 pounds/MSF can result in significant savings. For example, by adjusting the proportion of foam in the gypsum slurry, the set gypsum core of the present disclosure may have a much lower density than commercially available gypsum products. In certain embodiments, a gypsum wallboard of the present disclosure at a nominal thickness of ½ inch has a weight between about 1000 to 1300 pounds per MSF of board. This corresponds to a density of about 24 to about 31 lb/ft$^3$ (about 0.38 to 0.50 g/cc).

In certain embodiments, the gypsum core includes about 80 weight percent or above of set gypsum (i.e., fully hydrated calcium sulfate). For example, the gypsum core may include about 85 weight percent set gypsum. In some embodiments, the gypsum core includes about 95 weight percent set gypsum.

The facing sheets, also referred to interchangeably herein as "facer materials" or "facer mats", may comprise any fibrous material known to be suitable for facing gypsum board. Specific materials include paper, such as heavy, single, or multi-ply paper (e.g., medium or heavy Kraft paper, manila paper, etc.) and cardboard. For example, multi-ply paper used for the facing sheet of gypsum board products may have a basis weight from 40 to 65 pounds per MSF, an overall caliper of 250 to 350 microns, and a Gurley porosity from 15 seconds to 145 seconds. In some embodiments, different types of paper are used for each gypsum board surface. For example, manila paper may be used on one side, while newsliner may be used on the opposite side.

Paper and cardboard facing materials may be made from recycled fibers (e.g., used corrugated paper, Kraft cuttings, or waste newsprint), but they may also be partially or wholly made from virgin fibers. Other natural or synthetic fibrous materials also can be used, including those derived from metals or glass (e.g., fiberglass mat, chopped or continuous strand mat, or glass roving, both woven and non-woven). Other useful materials for the facing sheet include filament forming synthetic organic polymers (e.g., nylon, polyesters, polypropylene, polyethylene, rayon, and cellulosics), ceramics, cotton, cloth, hair, felt, and the like. Fibrous mats can be bound with, or coated with a resin binder. Multiple layers of fibrous materials, for example a composite sheet of a glass mat and Kraft paper, may also be used.

In certain embodiments, one or both of the mat facers may be coated, on the external and/or internal surfaces of the mat facer, to provide additional performance characteristics of the panel and/or facer.

It has been discovered that incorporation of a halide salt sequestration agent into the gypsum slurry is effective to remove salts, such as chloride salts, from the resulting set gypsum composition, to reduce the impact of those salts on the resulting gypsum panel properties. In particular, it has been found that these agents can be added to a gypsum composition with high chloride salt content and the facer to core bond strength returns to expected performance levels absent the chloride salts. For example, these compositions may be of particular use in panels having paper facers, because the halide salt sequestration agent may reduce the impact of salts on the paper to core bond strength. For example, gypsum panels of the present disclosure may display a paper facer to core humid bond strength of at least about 12 lbs/force.

As compared to alternative methods of washing the salt content from the gypsum material and disposing of the high salt content water, this disclosure allows for the sequestration of salts inside the halide salt sequestration agent, trapping the salt inside the wallboard. As such, it is believed that the present disclosure reduces the environmental impact of the gypsum cleaning process.

Gypsum Panels & Systems

Gypsum panels, and systems of such panels, are also provided herein. The gypsum panels may be manufactured to have any of the properties, or via any of the methods, described herein. In certain embodiments, a gypsum panel contains a gypsum core that comprises set gypsum and a halide salt sequestration agent, wherein the halide sequestration agent sequesters at least a portion of halide salt present in the gypsum core. For example, such panels may display enhanced strength and facer bonding properties.

In certain embodiments, as shown in FIG. 1, a gypsum panel 100 includes a gypsum core 101 having a first surface and a second opposed surface, and a first facer mat 104 associated with the first surface of the gypsum core 101, such that gypsum of the gypsum core penetrates and/or adheres to at least a portion of the first facer mat 104. The various layers are illustrated as separate layers in the figures for ease of illustration; however, it should be understood that overlap of these materials may occur at their interfaces.

Figure 2:
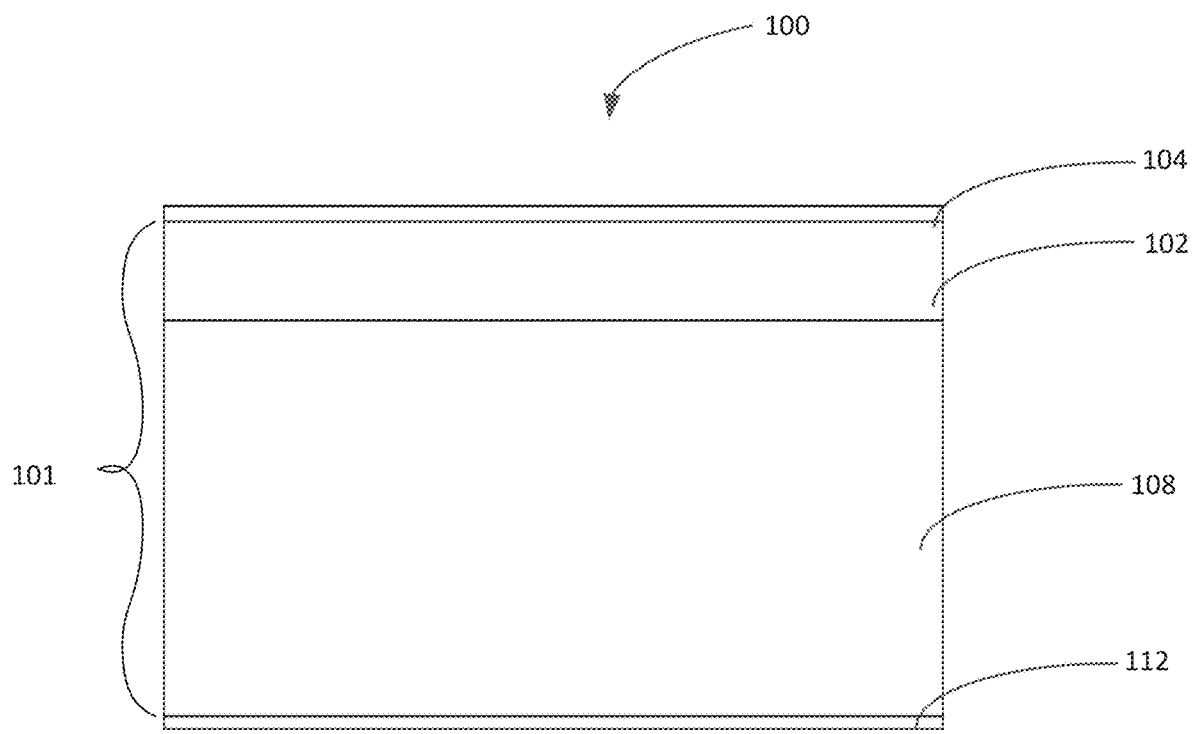
FIG. 2 is a cross-sectional view of a gypsum panel having two paper material facers.

In certain embodiments, as shown in FIG. 2, the gypsum core 101 includes two or more gypsum layers 102, 108. For example, the gypsum core may include various gypsum layers having different compositions. In some embodiments, the first gypsum layer 102 that is in contact with the facer mat 104 is a slate coat layer, as discussed above. In some embodiments, the first gypsum layer 102 is present in an amount from about 5 percent to about 20 percent, by weight, of the gypsum core 101. In certain embodiments, as shown in FIG. 2, the gypsum panel 100 includes two facer material mats 104, 112 that are associated with the gypsum core 101.

As discussed above, the panels may have a thickness from about ¼ inch to about 1 inch. For example, the panels may have a thickness of from about ½ inch to about ⅝ inch.

Figure 4:
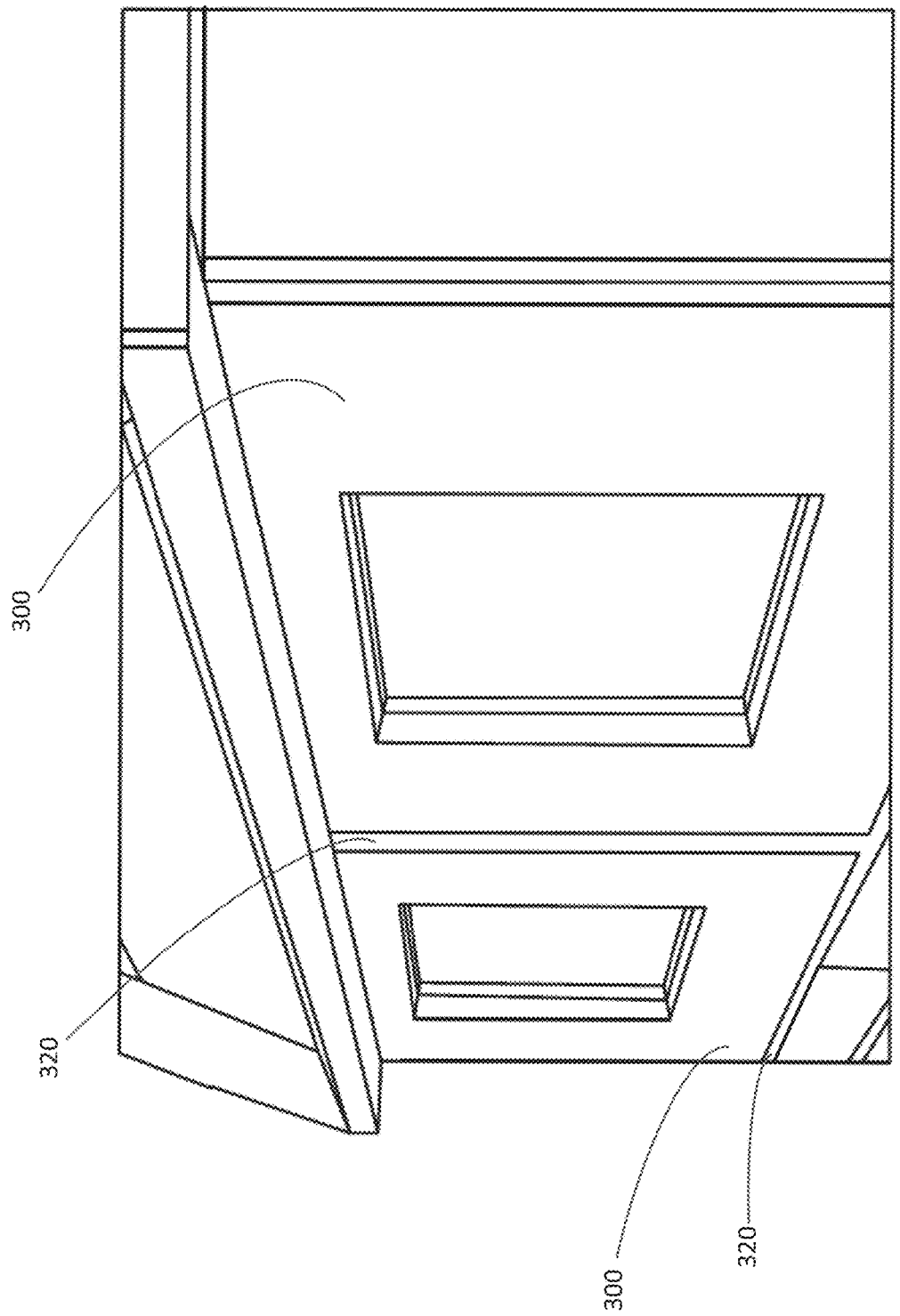
FIG. 4 is a perspective view of a building sheathing system.

Building sheathing systems are also provided herein, and include at least two of gypsum panels described herein, including any features, or combinations of features, of the panels described herein. For example, the gypsum panels may each include a gypsum core containing a halide salt sequestration agent. In certain embodiments, as shown in FIG. 4, a building sheathing system includes at least two gypsum panels 300 and a seaming component 320 configured to provide a seam at an interface between at least two of the gypsum panels 300. In certain embodiments, the seaming component comprises tape or a bonding material.

Example 1

Sample gypsum boards were manufacturing according to the follow process. 1. Gather four 4 in×4 in×0.5 in molds, arranging them in two rows of two, and place paper in them with the bond side facing up. 2. Weigh and hand mix all dry materials (e.g., stucco, starch, $CaCl_2$, experimental additive, etc.), typically 450 g of dry material is enough. 3. In a separate container, weigh and mix wet material until homogenous, (e.g., water, dispersant). 4. In a separate container, gather foam (1% soap solution) from foam generator and transfer desired amount of foam into its own container. 5. Initiate mix by dumping all contents of the dry mix into the wet mix solution, then mixing them with a high shear mixer at 1352 RPM for 5 seconds, or until slurry is consistent and free of lumps. 6. Dump slurry into foam container and mix with high shear mixer for 5 seconds, gently swirling and shaking the container so that the foam is mixed into slurry. 7. Pour slurry into the molds. 8. In a timely manner, use a 6 in or greater scraping knife to wipe off excess slurry from the top of the molds by gently scraping across the molds in one motion. 9. Adhere bond side of paper to the exposed surface of the slurry. 10. Place a 12 in×12 in glass on top of the molds. Prior to mixing, make sure glass is even and clean of debris. 11. Allow 5 to 10 minutes for slurry to set. 12. Remove boards and record weight. Weight of samples should be consistent with each other. 13. Wrap in aluminum foil and place in convection oven at 104° C. for 30 minutes. 14. Transfer to convection dryer at 110° F. for about 16 hours. 15. Record weight.

To evaluate the effect of an activated alumina halide salt sequestration agent to mitigate the decrease in humid bond strength typically observed due to the presence of salt, sample boards were made according to the following compositions in Table 1.

TABLE 1

| | Example 1 Experimental Gypsum Board Formulations | | | | | | | | | | |
|---|---|---|---|---|---|---|---|---|---|---|---|
| | Neat Board Control | 1 lb/msf AA T1 | 5 lb/msf AA T2 | 10 lb/msf AA T3 | 15 lb/msf AA T4 | 20 lb/msf AA T5 | 1 lb/msf AA T1C | 5 lb/msf AA T2C | 10 lb/msf AA T3C | 15 lb/msf AA T4C | 20 lb/msf AA T5C |
| Stucco, g | 442.88 | 442.50 | 440.99 | 439.12 | 437.26 | 435.42 | 442.50 | 440.99 | 439.12 | 437.26 | 435.42 |
| Starch, g | 3.85 | 3.85 | 3.83 | 3.82 | 3.80 | 3.79 | 3.85 | 3.83 | 3.82 | 3.80 | 3.79 |
| $CaCl_2$ (96%, Anhydrous) | 1.8 | 1.8 | 1.8 | 1.8 | 1.8 | 1.8 | 0 | 0 | 0 | 0 | 0 |
| Activated Aluminum (28 × 48 Mesh, (0.7 mm particle size)) | 0 | 0.38 | 1.92 | 3.82 | 5.70 | 7.57 | 0.38 | 1.92 | 3.82 | 5.70 | 7.57 |
| Dispersant, g | 3.27 | 3.27 | 3.26 | 3.25 | 3.23 | 3.22 | 3.27 | 3.26 | 3.25 | 3.23 | 3.22 |
| Foam, g | 20-23 | 20-23 | 20-23 | 20-23 | 20-23 | 20-23 | 20-23 | 20-23 | 20-23 | 20-23 | 20-23 |
| Water, g | 460.59 | 460.20 | 458.63 | 456.68 | 454.75 | 452.84 | 460.20 | 458.63 | 456.68 | 454.75 | 452.84 |

EXAMPLES

Gypsum panels formed from gypsum slurries containing halide salt sequestration agents, as disclosed herein, were manufactured and tested according to the following examples.

After the samples were manufactured, they were subjected to a humid bond force test, according to the following test procedure. 1. Once samples have been dried for −12 hours at 100° F., allow samples to precondition by sitting in ambient atmosphere for 30 minutes. 2. Set conditioning cabinet to 90% relative humidity and 90° F. 3. Prior to placing in conditioning cabinet, score samples 1.25 in from the edge, across the sample using humid bond jig. 4. Once conditions have been achieved, in 10 minute intervals, place a set of 6 samples in conditioning cabinet. 5. Once an hour has elapsed from the first set, take out first set of samples. 6. Snap the board along the score, making sure not to peel any paper. 7. Place in Humid Bond testing apparatus on United Tester. 8. Test and record humid bond in lbs/F. 9. Check and record percentage bond failure.

Figure 5:
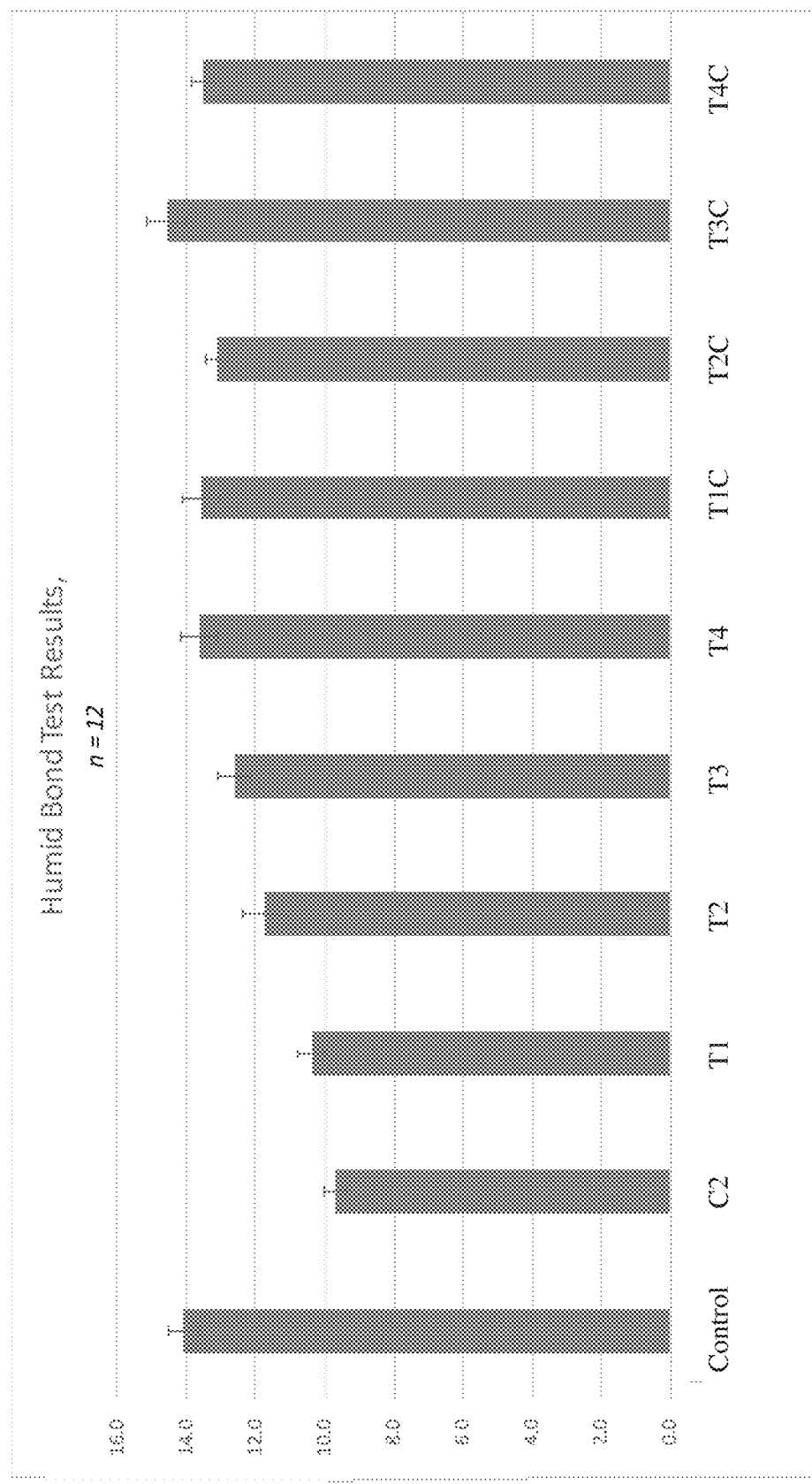
FIG. 5 is a graph showing the results of the humid bond test of Example 1.

The samples were tested accordingly and the results are shown in Table 2 below and are graphically depicted in FIG. 5.

sample, but not touching. 6. Zero the load indicator and begin test. 7. Record nail pull resistance as lbs/force.

Figure 6:
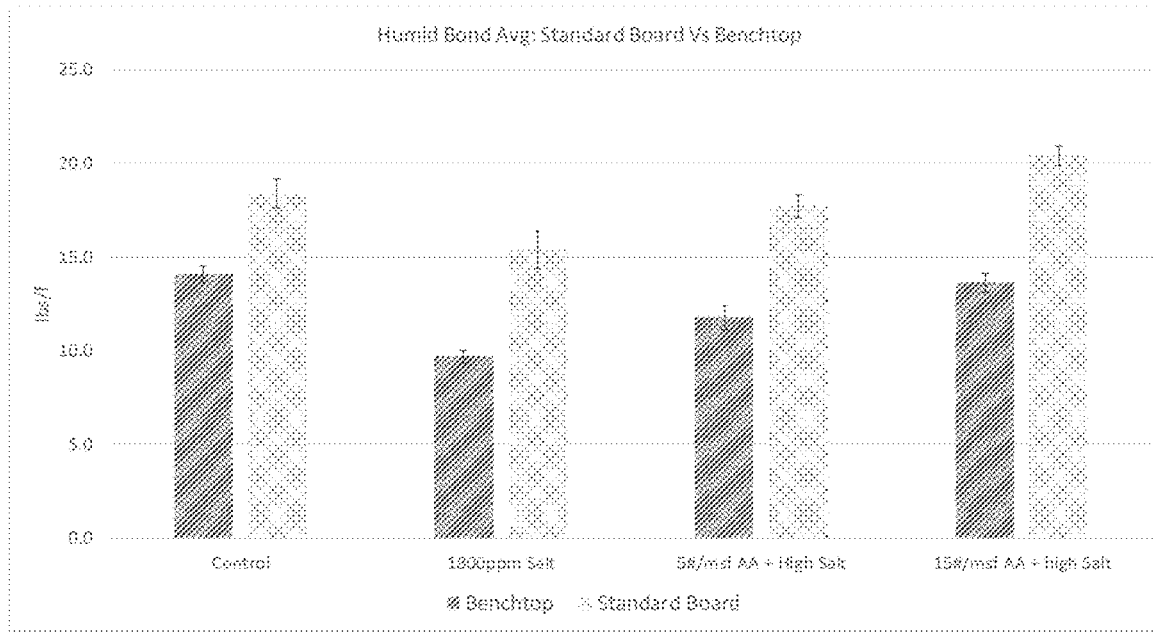
FIG. 6 is a graph showing the results of the humid bond test of Example 2.
Figure 7:
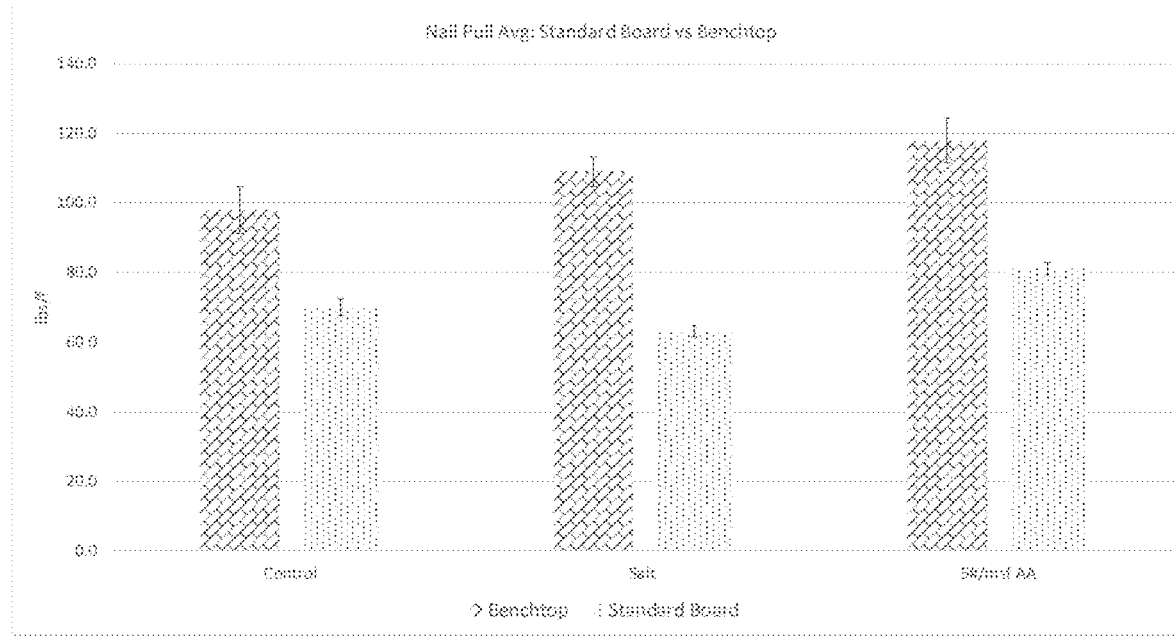
FIG. 7 is a graph showing the results of the nail pull test of Example 2.

The comparative results of the humid bond test and the nail pull test, for the benchtop and standard size boards, are illustrated in the graphs of FIGS. 6 and 7, respectively. As can be seen, the full size boards displayed the same trend as was observed with the bench top board samples. Namely, as the salt content of the full size boards decreased (i.e., through increased addition of salt sequestration agents), the humid bond performance and nail pull performance increased.

TABLE 2

Example 1 Humid Bond Test Results

|  | Control Neat Stucco, Disp., Starch | C2 1800 ppm $CaCl_2$ | T1 1#/msf Alum + 1800 ppm $CaCl_2$ | T2 5#/msf Alum + 1800 ppm $CaCl_2$ | T3 10#/msf Alum + 1800 ppm $CaCl_2$ | T4 15#/msf Alum + 1800 ppm $CaCl_2$ | T1C Neat 1#/msf Alum | T2C Neat 5#/msf Alum | T3C Neat 10#/msf Alum | T4C Neat 15#/msf Alum |
|---|---|---|---|---|---|---|---|---|---|---|
|  | 14.3 | 10.8 | 12.5 | 13.0 | 10.8 | 13.4 | 13.2 | 11.9 | 13.0 | 12.6 |
|  | 15.6 | 8.6 | 10.6 | 13.7 | 10.6 | 14.9 | 14.6 | 13.3 | 13.6 | 13.0 |
|  | 16 | 10.9 | 11.9 | 12.8 | 10.2 | 12.7 | 14.5 | 12.5 | 14.6 | 14.6 |
|  | 15.6 | 11.1 | 12.6 | 10.7 | 12.9 | 11.2 | 9.0 | 14.4 | 16.6 | 14.3 |
|  | 13.2 | 10.1 | 10.4 | 9.5 | 13.0 | 11.3 | 11.8 | 13.4 | 15.8 | 13.7 |
|  | 13.2 | 8.7 | 8.2 | 7.7 | 13.3 | 13.7 | 13.8 | 12.1 | 16.8 | 16.1 |
|  | 14.4 | 7.8 | 9.1 | 13.1 | 14.9 | 12.3 | 16.2 | 12.4 | 11.6 | 12.5 |
|  | 13.2 | 8.2 | 9.1 | 16.2 | 13.0 | 13.9 | 15.2 | 12.0 | 11.4 | 12.0 |
|  | 15.6 | 10.3 | 10.3 | 10.4 | 11.8 | 16.9 | 14.7 | 15.5 | 13.9 | 12.7 |
|  | 11.9 | 10.4 | 8.6 | 11.1 | 14.7 | 16.4 | 12.8 | 13.7 | 14.9 | 14.5 |
|  | 11.4 | 10.3 | 10.5 | 11.9 | 14.6 | 12.9 | 12.5 | 12.3 | 16.7 | 12.5 |
|  | 14.6 | 9 | 10.7 | 11.0 | 11.5 | 14.0 | 14.7 | 14.0 | 16.0 | 14.0 |
| Average lbs/force | 14.1 | 9.7 | 10.4 | 11.8 | 12.6 | 13.6 | 13.6 | 13.1 | 14.6 | 13.5 |
| Standard Dev | 1.5 | 1.1 | 1.4 | 2.2 | 1.6 | 1.8 | 1.9 | 1.1 | 1.9 | 1.2 |
| S. Error | 0.438 | 0.332 | 0.418 | 0.637 | 0.472 | 0.513 | 0.550 | 0.324 | 0.551 | 0.346 |

As is illustrated by these results, for the samples containing calcium chloride, the greater amount of loading of activated alumina results in increased humid bond strength, with 15 lb/msf loading of activated alumina showing comparable or better humid bond strength to an otherwise identical sample without the salt.

Thus, the gypsum panels made by the methods disclosed herein may display an average lbs/force, as measured in the above-described humid bond test, of from 80 percent up to 100 percent, or greater, of the strength displayed by an otherwise identical board having no, or negligible, gypsum salt content.

Example 2

Next, the bench model boards described in Example 1 were compared to sample boards made to standard board size (i.e., full size) and properties, to determine whether the impact of the halide salt sequestration agent scaled to full size boards. The humid bond test described above was conducted on these boards and a nail pull test was conducted according to the following process. 1. Once samples have been dried for ~12 hours at 100° F., allow to precondition at ambient atmosphere until constant weight is achieved. 2. Record weight. 3. Using a drill press, drill a 7/64" diameter hole through the center of each sample. 4. Place sample onto testing stage of United Tester, in which the 3" diameter hole in the middle of the stage is in the middle of the testing sample. 5. Lower nail shank close to the 7/64" hole of the Example 3

Next, the effect of the activated alumina on the chloride concentration in natural gypsum and FGD samples was investigated using ion chromatography.

First, the gypsum/FGD materials were calcined according to the following procedure. 1. Check initial total water percent of gypsum/stucco. If sample is 22-27%, allow to dry in convection oven t at 100° F. overnight to achieve 17-19% total water. 2. Set convection oven to 330° F. (165° C.) and allow to achieve set point. 3. Spread out gypsum in an even, thin layer, approximately 2-3 inches deep, in a wide pan or casserole dish. 4. Place pan in the oven. 5. In 10 minute intervals, remove pan and stir gypsum, to ensure even drying, and return to oven. 6. Measure and record total water analysis. 7. Calcining has been achieved once total water of 4-6% has been achieved.

Next, sample boards were made according to the following procedure. 1. Gather two 4 in×4 in×0.5 in molds. 2. Once gypsum has been calcined to stucco, weigh up dry material (stucco and/or experimental additives). 3. In separate container, weigh out water. 4. Pour dry material into aqueous solution, and mix using high shear mixer for 5 seconds until consistent. 5. Pour slurry into molds. 6. Wrap in foil and dry in convection oven at 104° C. for 30 minutes. 7. Transfer to convection dryer set at 100° F. overnight. 8. Grind samples to powder using rock crusher and pulverizer.

Next, the salt (sodium and chloride) content of the samples is tested according to the following procedure. 1.

Place 10 grams of prepared sample in a 250 ml beaker (Samples are tested in duplicates). 2. Add 100 ml of deionized water to each beaker. 3. Cook (use hot plate) samples for 20 minutes at low temperature. 4. Stir occasionally. 5. After samples have been heated as directed, vacuum filtrate the entire solution of each beaker through a large funnel into 500 ml Erlenmeyer flask. 6. Wash stirring rod and beaker with deionized water. 7. Allow filtrate to cool. 8. Measure 50 ml of solution using a 50 ml graduated cylinder. 9. Pour the solution into a 100 ml volumetric flask. 10. Rinse cylinder thoroughly with deionized water and pour into volumetric flask. 11. Fill volumetric flask to the mark with deionized water. 12. Mix solution thoroughly. 13. Once solutions are made and standards are ran, place samples in ion chromatography instrument. 14. Run chlorides and then sodiums to give total salt results.

The results of these tests for various sample formulations are shown in Table 3 below and are represented graphically in FIG. 8.

TABLE 3

Example 3 Experimental Results

| Sample | Neat Stucco | Low CaCl$_2$ (600 ppm) | Low CaCl$_2$ ppm + 15#AA | High CaCl$_2$ (1800 ppm) | High CaCl$_2$ ppm + 15#AA | Neat FGD | FGD + 5#AA | FGD + 15#AA |
|---|---|---|---|---|---|---|---|---|
| NaCl % | 0.008 | 0.011 | 0.017 | 0.010 | 0.018 | 0.020 | 0.017 | 0.024 |
| Na$_2$SO$_4$ % | None | None | None | None | None | None | None | None |
| CaCl$_2$ % | 0.025 | 0.138 | 0.097 | 0.187 | 0.157 | 0.105 | 0.103 | 0.082 |
| Total Salt, Oz/Ton | 10.531 | 47.742 | 36.378 | 63.256 | 55.957 | 40.075 | 38.411 | 34.011 |
| Total Salt, ppm | 329.09 | 1491.95 | 1136.81 | 1976.74 | 1748.66 | 1252.36 | 1200.33 | 1062.84 |
| Na$^+$ conc., ppm | 1.57 | 2.08 | 3.39 | 1.98 | 3.40 | 3.89 | 3.20 | 4.84 |
| | 1.54 | 2.41 | 3.18 | 2.05 | 3.78 | 4.17 | 3.47 | 4.59 |
| Cl$^-$ conc., ppm | 10.48 | 45.79 | 37.51 | 65.13 | 57.18 | 38.43 | 35.92 | 34.16 |
| | 10.29 | 49.16 | 34.58 | 60.83 | 53.95 | 40.92 | 40.22 | 32.97 |
| Average Cl | 10.39 | 47.48 | 36.05 | 62.98 | 55.57 | 39.68 | 38.07 | 33.57 |
| Difference Cl | | | 11.43 | | 7.415 | | 1.605 | 6.11 |
| Total salt Diff | | | 355.14 | | 228.08 | | 52.03 | 189.51 |

Figure 8:
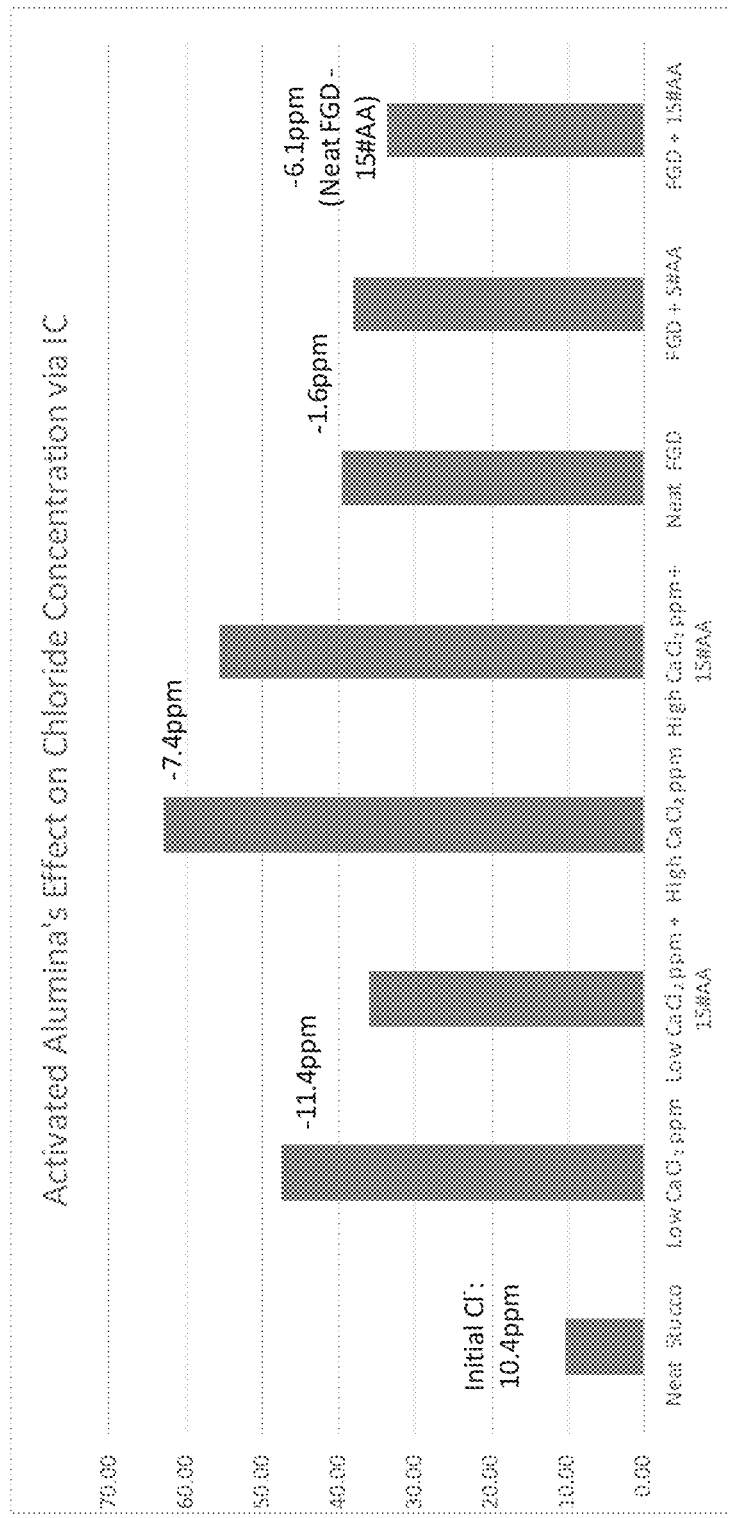
FIG. 8 is a graph showing the results of the ion chromatography tests of Example 3.

As can be seen in FIG. 8, the FGD displayed a high salt content as compared to the naturally occurring gypsum. The naturally occurring stucco was doused with calcium chloride to mimic the impact of a naturally occurring high or low salt content in the lab. The increased presence of activated alumina resulted in a corresponding reduction in the concentration of chloride ions detectable.

Figure 9:
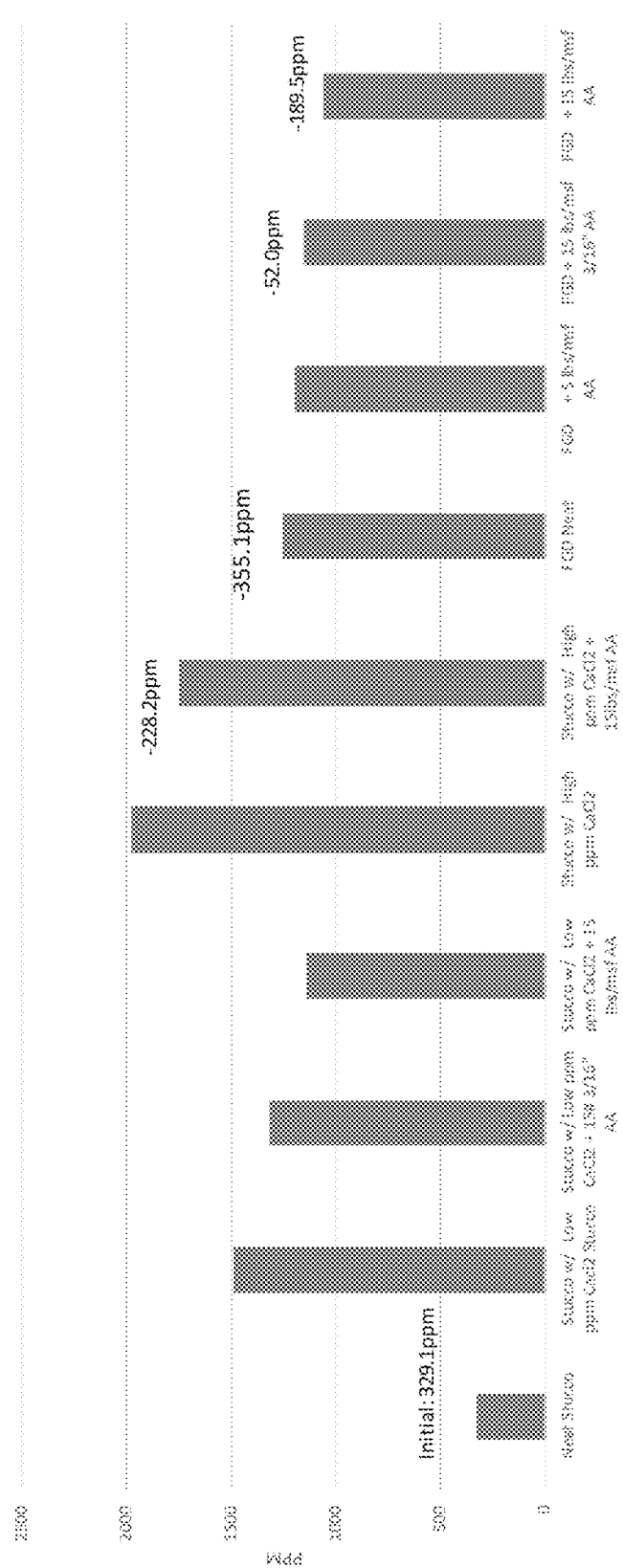
FIG. 9 is a graph showing the results of the ion chromatography tests of Example 3.

Next, the impact of various amounts of activated alumina on stucco doused with low (600 ppm) and high (1800 ppm) concentrations of calcium chloride and on FGD having a relatively high salt content, on overall salt content, was tested using ion chromatography. The results are shown in Table 4 below and graphically in FIG. 9.

TABLE 4

Further Example 3 Experimental Results

| Sample | Stucco Control | 600 ppm CaCl$_2$ | Low Salt Conc. + 15# AA 3/16" | 600 ppm CaCl$_2$ + 15#AA 0.7 mm | 1800 ppm CaCl$_2$ | 1800 ppm CaCl$_2$ + 15#AA | FGD Control | FGD + 5#AA | FGD + 15#AA 3/16" | FGD + 15#AA 0.7 mm |
|---|---|---|---|---|---|---|---|---|---|---|
| NaCl, % | 0.0079 | 0.0114 | 0.010 | 0.0167 | 0.0102 | 0.0183 | 0.0205 | 0.0170 | 0.021 | 0.0240 |
| Na2SO4, % | None | None | None | None | None | None | None | None | None | None |
| CaCl2, % | 0.0250 | 0.1378 | 0.122 | 0.0970 | 0.1874 | 0.1566 | 0.1047 | 0.1031 | 0.095 | 0.0823 |
| Total Salt, Oz/ton | 10.5309 | 47.7424 | 42.227 | 36.3779 | 63.2556 | 55.9571 | 40.0754 | 38.4105 | 36.962 | 34.0110 |
| Total Salt, ppm | 329.1 | 1492.0 | 1319.6 | 1136.8 | 1976.7 | 1748.7 | 1252.4 | 1200.3 | 1155.1 | 1062.8 |
| Difference | 329.1 | | 172.4 | 355.1 | | 228.1 | | 52.0 | 97.3 | 189.5 |

As can be seen, at both the low and high salt concentrations in the natural stucco, the activated alumina is effective at reducing the amount of salt found in the ion chromatography. Likewise, in the FGD samples, the greater amounts of activated alumina reduced the amount of salt identified in the sample.

Example 4

Figure 10:
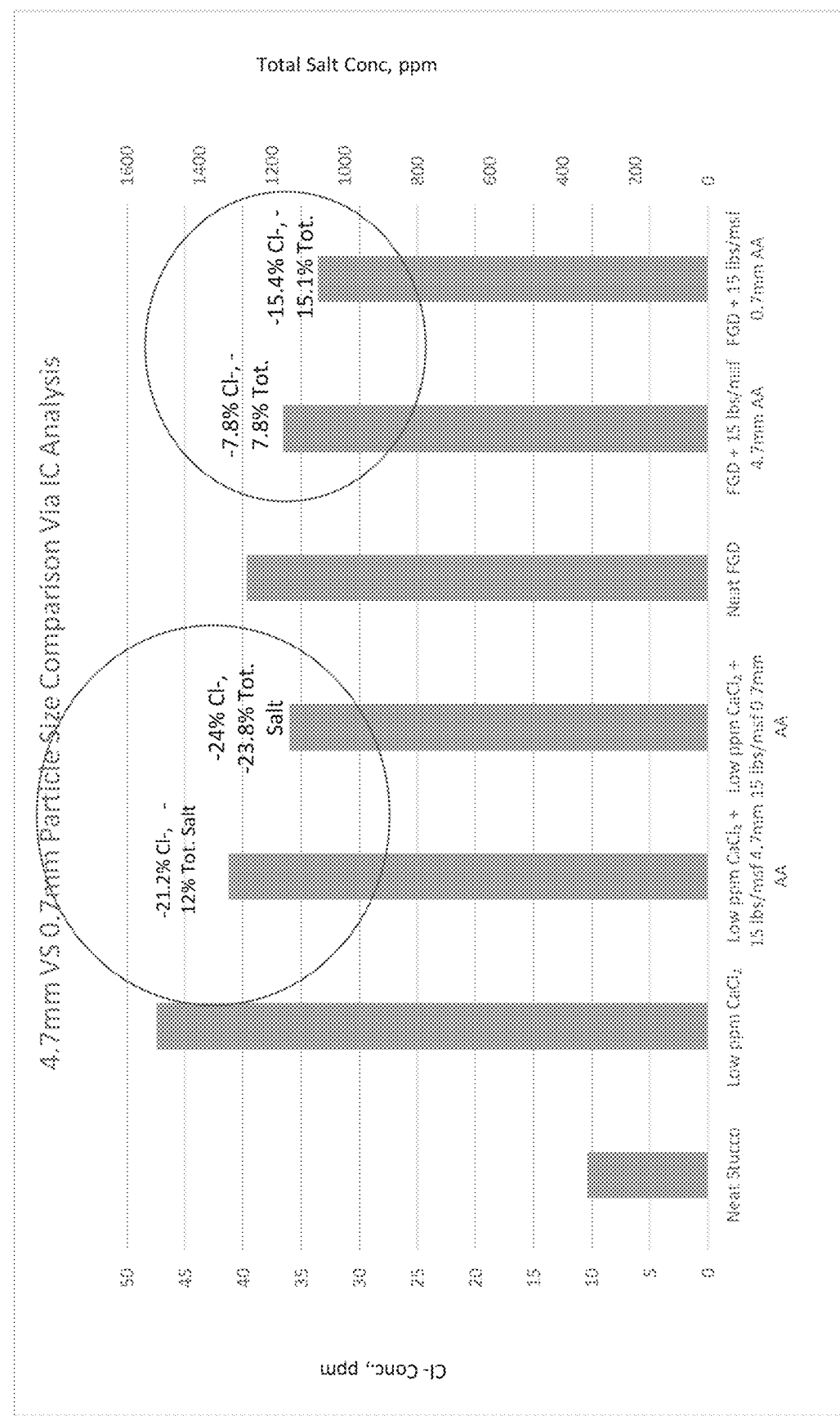
FIG. 10 is a graph showing the results of the ion chromatography tests of Example 4.

Next, the impact of the particle size (4.7 mm versus 0.7 mm) of the activated alumina salt sequestration agent was tested via IC analysis, as described in prior Examples. The experimental results are shown below in Tables 5-7, and graphically in FIG. 10.

TABLE 5

Example 5 Experimental Results

| Sample | Stucco Control | 600 ppm $CaCl_2$ | 600 ppm $CaCl_2$ + 15#AA | 1800 ppm $CaCl_2$ | 1800 ppm $CaCl_2$ + 15#AA | FGD Control | FGD + 5#AA | FGD + 15#AA |
|---|---|---|---|---|---|---|---|---|
| NaCl % | 0.008 | 0.011 | 0.017 | 0.010 | 0.018 | 0.020 | 0.017 | 0.024 |
| $Na_2SO_4$ % | None | None | None | None | None | None | None | None |
| $CaCl_2$ % | 0.025 | 0.138 | 0.097 | 0.187 | 0.157 | 0.105 | 0.103 | 0.082 |
| Total Salt, Oz/Ton | 10.531 | 47.742 | 36.378 | 63.256 | 55.957 | 40.075 | 38.411 | 34.011 |
| Total Salt, ppm | 329.09 | 1491.95 | 1136.81 | 1976.74 | 1748.66 | 1252.36 | 1200.33 | 1062.84 |
| $Na^+$ conc., ppm | 1.57 | 2.08 | 3.39 | 1.98 | 3.40 | 3.89 | 3.20 | 4.84 |
|  | 1.54 | 2.41 | 3.18 | 2.05 | 3.78 | 4.17 | 3.47 | 4.59 |
| $Cl^-$ conc., ppm | 10.48 | 45.79 | 37.51 | 65.13 | 57.18 | 38.43 | 35.92 | 34.16 |
|  | 10.29 | 49.16 | 34.58 | 60.83 | 53.95 | 40.92 | 40.22 | 32.97 |

TABLE 6

Further Example 5 Experimental Results

| Sample | 600 ppm + 15#AA 3/16 | 1800 ppm + 15#AA 3/16 | FGD + 5#AA 3/16 | FGD + 15#AA 3/16 | 1800 ppm + 15#AC |
|---|---|---|---|---|---|
| NaCl % | 0.010 | 0.013 | 0.017 | 0.021 | 0.011 |
| $Na_2SO_4$ % | None | None | None | None | None |
| $CaCl_2$ % | 0.122 | 0.248 | 0.122 | 0.095 | 0.246 |
| Total Salt, Oz/Ton | 42.227 | 83.489 | 44.442 | 36.962 | 82.212 |
| Total Salt, ppm | 1319.60 | 2609.02 | 1388.81 | 1155.06 | 2569.13 |
| $Na^+$ conc., ppm | 1.88 | 2.35 | 3.29 | 3.94 | 2.26 |
|  | 1.86 | 2.72 | 3.52 | 4.17 | 2.22 |
| $Cl^-$ conc., ppm | 29.68 | 84.70 | 45.68 | 36.55 | 83.10 |
|  | 44.32 | 81.57 | 42.49 | 36.58 | 80.67 |
| Average | 37.00 | 83.135 | 44.085 | 36.565 | 81.885 |

TABLE 7

Further Example 5 Experimental Results

| Sample | Neat Stucco | Low ppm $CaCl_2$ | Low ppm $CaCl_2$ + 15 lbs/msf 4.7 mm AA | Low ppm $CaCl_2$ + 15 lbs/msf 0.7 mm AA | Neat FGD | FGD + 15 lbs/msf 4.7 mm AA | FGD + 15 lbs/msf 0.7 mm AA | High $CaCl_2$ ppm | High $CaCl_2$ ppm + 15#AA | FGD + 5#AA |
|---|---|---|---|---|---|---|---|---|---|---|
| Average Cl | 10.39 | 47.48 | 37 | 36.05 | 39.68 | 36.60 | 33.57 | 62.98 | 55.57 | 38.07 |
| Total Salt | 329.1 | 1491.9 | 1319.60 | 1136.8 | 1252.4 | 1155.06 | 1062.8 |  |  |  |
| % $Cl^-$ |  |  | −22.06% | −24.08% |  | −7.75% | −15.40% |  |  |  |
| % total Salt |  |  | −11.55% | −23.80% |  | −7.77% | −15.14% |  |  |  |

As can be seen, while all samples containing activated alumina were effective at reducing the impact of the salt content of the samples, the smaller particle size activated alumina was even more effective, which is believed to be due to its increased surface area per mass.

Example 5

Additionally, the effect of a halide salt sequestration agent containing perlite, in expanded and unexpanded (raw) form, on salt concentration was tested via ion chromatography. The experimental formulations as shown below in Table 8.

TABLE 8

Example 5 Formulations

| | Control | Experimental Control | Experimental 1 (CC Stucco + Salt + Raw unexpanded Perlite) | Experimental 2 (CC Stucco + Salt + expanded Perlite) | FGD Control | Experimental 3 (FGD + Raw Unexpanded Perlite) | Experimental 4 (FGD + Expanded Perlite) |
|---|---|---|---|---|---|---|---|
| Stucco, g | 200 | 200 | 200 | 200 | | | |
| FGD, g | | | | | 200 | 200 | 200 |
| CaCl$_2$, g | | 0.65 | 0.65 | 0.65 | | | |
| Raw Perlite, unexpanded, g | | | 2.61 | | | 2.61 | |
| Perlite, Expanded, g | | | | 2.61 | | | 2.61 |
| Water, g | 160 | 160 | 160 | 160 | 160 | 160 | 160 |

As in prior Examples, the stucco was doused with CaCl$_2$) to achieve high salt concentration, 1800 ppm, made into a board then grinded up for IC. FGD was dried to 4-6% total water, made into a board then grinded up for IC.

Figure 11:
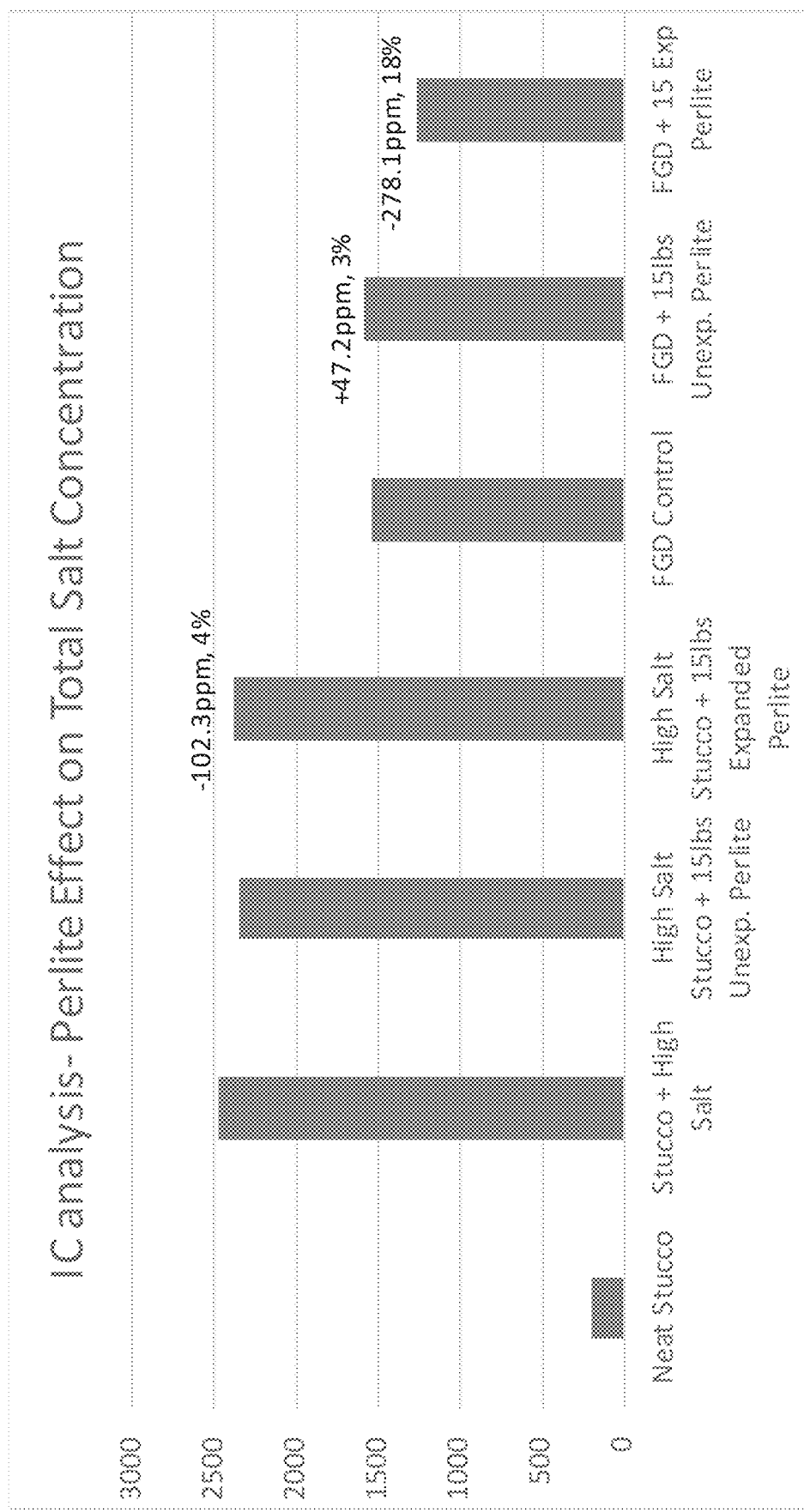
FIG. 11 is a graph showing the results of the ion chromatography tests of Example 5.

The ion chromatography results for these samples are shown below in Table 9 and graphically in FIG. 11.

TABLE 9

Ion Chromatography Results for Example 5

| Sample | Control | Experimental Control | CC Stucco + Salt + 15 lbs Unexp. Perlite | CC Stucco + Salt + 15 lbs expanded Perl | FGD Control | FGD + 15 lbs Unexp. Perlite | FGD + 15 Exp Perl |
|---|---|---|---|---|---|---|---|
| NaCl % | 0.002 | 0.002 | 0.002 | 0.003 | 0.015 | 0.014 | 0.015 |
| Na$_2$SO$_4$ % | None | None | None | None | None | None | None |
| CaCl$_2$ % | 0.017 | 0.245 | 0.231 | 0.234 | 0.139 | 0.145 | 0.111 |
| Total Salt, Oz/Ton | 6.141 | 79.045 | 74.721 | 75.773 | 49.233 | 50.744 | 40.334 |
| Total Salt, ppm | 191.91 | 2470.16 | 2335.02 | 2367.9 | 1538.52 | 1585.75 | 1260.42 |
| Difference Cl | | | 0.014 | −0.011 | | 0.006 | 0.028 |
| Difference Total Salt | | | 135.14 | 102.26 | | 47.23 | 278.1 |
| %, Total Salt | | | 5.47% | 4.14% | | 3.07% | 18.08% |

As can be seen, both the unexpanded and expanded forms of perlite were effective to reduce the impact of salt in the samples.

Example 6

Further samples utilizing perlite as the halide salt sequestration agent were manufactured according to the formulations outlined in Table 10.

| Experimental Formulations for Example 6 | | | | |
|---|---|---|---|---|
| | Control-C0 | Control-C1 | Experimental Control-C2 | Experimental Control-C3 |
| Raw Materials | Lightweight Formulation | High Salt concentration | High Salt + 5 lbs AA | High Salt + 15 lbs AA |
| Stucco, g | 442.88 | 442.88 | 440.99 | 437.26 |
| Water, g (w/s ratio) | 398.59 | 398.59 | 396.89 | 393.54 |
| Starch, g | 3.85 | 3.85 | 3.83 | 3.80 |
| Dispersant, g | 3.27 | 3.27 | 3.26 | 3.23 |
| CaCl2, g | — | 1.80 | 1.80 | 1.80 |
| Perlite, Unexpanded g | — | — | — | — |
| Perlite, expanded g | — | — | — | — |
| Activated Alumina, g | — | — | 1.92 | 5.70 |
| Soap, #/msf | 1% solution | 1% solution | 1% solution | 1% solution |
| Paper | 54 lbs face 44 lbs back | 54 lbs face 44 lbs back | 54 lbs face 44 lbs back | 54 lbs face 44 lbs back |

| | T1C | T1 | T2C | T2 | T3C | T3 | T4C | T4 |
|---|---|---|---|---|---|---|---|---|
| Raw Materials | 5 lbs/msf Neat Unexpanded Perlite | High Salt + 5 lbs Unexpanded Perlite | 15 lbs/msf Neat Unexpanded Perlite | High Salt + 15 lbs Unexpanded Perlite | 5 lbs/msf Neat Expanded Perlite | High Salt + 5 lbs Expanded Perlite | 15 lbs/msf Neat Expanded Perlite | High Salt + 15 lbs Expanded Perlite |
| Stucco, g | 440.99 | 440.99 | 437.26 | 437.26 | 440.99 | 440.99 | 437.26 | 437.26 |
| Water, g (w/s ratio) | 396.89 | 396.89 | 393.54 | 393.54 | 396.89 | 396.89 | 393.54 | 393.54 |
| Starch, g | 3.83 | 3.83 | 3.80 | 3.80 | 3.83 | 3.83 | 3.80 | 3.80 |
| Dispersant, g | 3.26 | 3.26 | 3.23 | 3.23 | 3.26 | 3.26 | 3.23 | 3.23 |
| CaCl2, g | — | 1.80 | — | 1.80 | — | 1.80 | — | 1.80 |
| Perlite, Unexpanded g | 1.92 | 1.92 | 5.7 | 5.70 | — | — | — | — |
| Perlite, expanded g | — | — | — | — | 1.92 | 1.92 | 5.7 | 5.70 |
| Activated Alumina, g | — | — | — | — | — | — | — | — |
| Soap, #/msf | 1% solution | 1% solution | 1% solution | 1% solution | 1% solution | 1% solution | 1% solution | 1% solution |
| Paper | 54 lbs face 44 lbs back | 54 lbs face 44 lbs back | 54 lbs face 44 lbs back | 54 lbs face 44 lbs back | 54 lbs face 44 lbs back | 54 lbs face 44 lbs back | 54 lbs face 44 lbs back | 54 lbs face 44 lbs back |

Figure 12:
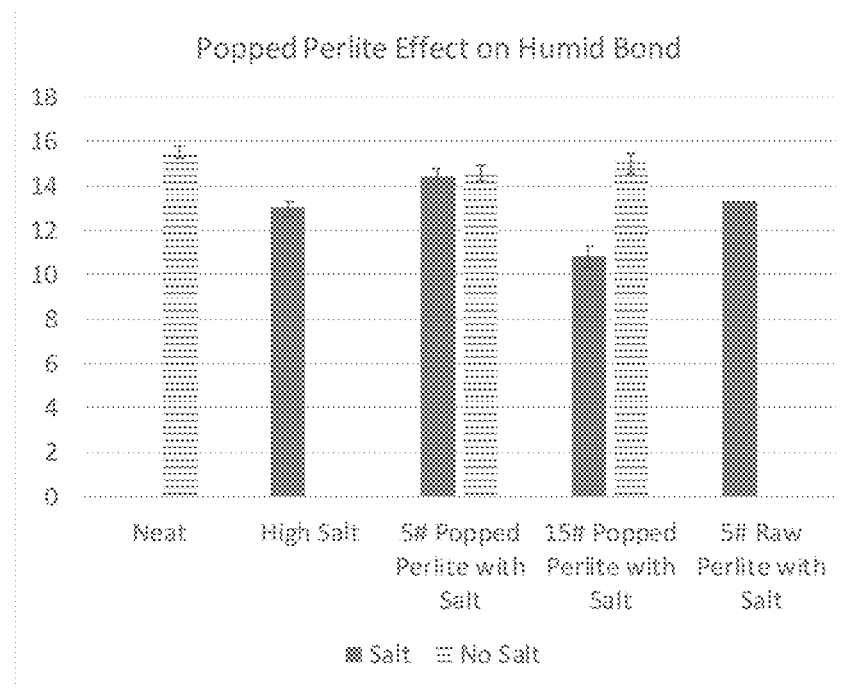
FIG. 12 is a graph showing the results of the humid bond test of Example 6.
Figure 13:
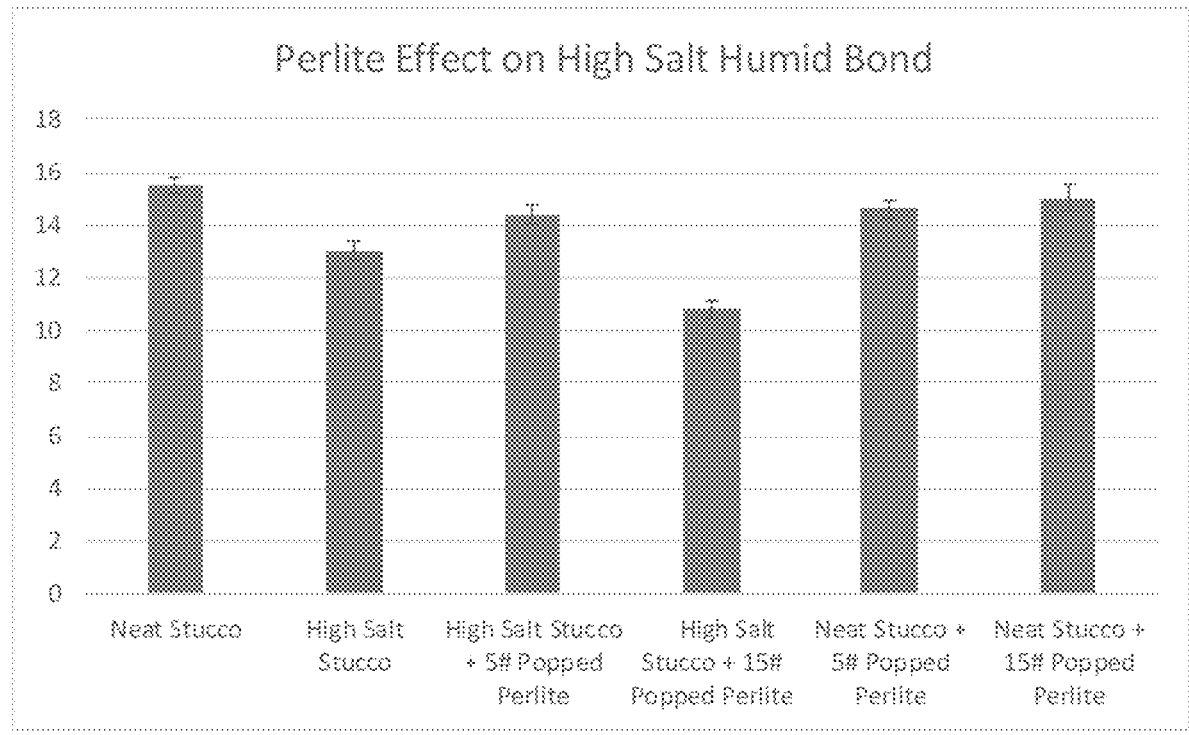
FIG. 13 is a graph showing the results of the humid bond test of Example 6.

Humid bond tests were conducted on these samples, with the results shown below in Tables 11 and 12 and in FIGS. 12 and 13.

TABLE 11

Humid Bond Test Results for Perlite Compositions

| Sample | Salt | No Salt | StError With Salt | StError w/o salt |
|---|---|---|---|---|
| Neat | | 15.5 | | 0.283660875 |
| High Salt | 13 | | 0.3494849 | |
| 5# Popped Perlite with Salt | 14.4 | 14.6 | 0.3134112 | 0.352239857 |
| 15# Popped Perlite with Salt | 10.8 | 15 | 0.3257643 | 0.502034922 |
| 5# Raw Perlite with Salt | 13.3 | | 0.4427071 | |

TABLE 12

Humid Bond Test Results for Perlite Compositions

| | Humid Bond | St. Error |
|---|---|---|
| Neat Stucco | 15.5 | 0.2836 |
| High Salt Stucco | 13 | 0.3494 |
| High Salt Stucco + 5# Popped Perlite | 14.4 | 0.3134 |
| High Salt Stucco + 15# Popped Perlite | 10.8 | 0.3257 |
| Neat Stucco + 5# Popped Perlite | 14.6 | 0.3522 |
| Neat Stucco + 15# Popped Perlite | 15 | 0.502 |

As can be seen, the expanded perlite was effective at mitigating the impact of the salt, allowing for improved bond strength between the gypsum core and the paper facer, as compared to gypsum panels in which no salt sequestration agent is present.

Thus, it has been discovered that the negative impact of salt present in various forms of gypsum may be mitigated utilizing certain salt sequestration agents. Panel strength and core-paper facer bond strength may be improved by utilizing halide salt sequestration agents in amounts effective to sequester at least a portion of any salt present in the gypsum stucco.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of making a gypsum panel, comprising:
combining gypsum stucco and a halide salt sequestration agent with water to form a gypsum slurry; and
setting the gypsum slurry to form at least a portion of a gypsum core,
wherein the halide salt sequestration agent is present in an amount effective to sequester at least a portion of halide salt present in the gypsum stucco, and
wherein the halide salt sequestration agent has a porous surface.

2. The method of claim 1, wherein the gypsum stucco comprises at least 600 ppm of halide salt.

3. The method of claim 1, wherein the halide salt sequestration agent comprises alumina or perlite.

4. The method of claim 1, wherein the halide salt sequestration agent comprises alumina, and wherein the halide salt sequestration agent has a surface area of at least 200 $m^2/g$.

5. The method of claim 1, wherein the alumina comprises activated alumina.

6. The method of claim 5, wherein the activated alumina has an average particle size of less than 1 mm.

7. The method of claim 1, further comprising heating the halide sequestration agent prior to combining the halide sequestration agent with the gypsum stucco, wherein the heating is effective to expand or activate at least a portion of the halide sequestration agent.

8. The method of claim 1, further comprising associating a facer material with the gypsum slurry or the gypsum core.

9. The method of claim 8, wherein:
the facer material comprises a paper facer material, and
the gypsum panel displays a paper facer to core humid bond strength of at least about 12 lbs/f.

10. The method of claim 1, wherein the gypsum stucco comprises gypsum obtained from a natural source or from a flue gas desulfurization process.

11. A gypsum panel, comprising:
a gypsum core that comprises set gypsum and a halide salt sequestration agent;
wherein the halide sequestration agent is present in an amount effective to sequester at least a portion of halide salt present in the gypsum core, and
wherein the halide salt sequestration agent has a porous surface.

12. The gypsum panel of claim 11, wherein the gypsum core comprises at least 600 ppm of halide salt.

13. The gypsum panel of claim 11, wherein the halide salt sequestration agent comprises alumina or perlite.

14. The gypsum panel of claim 11, wherein the halide salt sequestration agent comprises alumina, and wherein the halide salt sequestration agent has a surface area of at least 200 $m^2/g$.

15. The gypsum panel of claim 14, wherein the activated alumina has an average particle size of less than 1 mm.

16. The gypsum panel of claim 11, further comprising a facer material associated with the gypsum core.

17. The gypsum panel of claim 16, wherein:
the facer material comprises a paper facer material, and
the gypsum panel displays a paper facer to core humid bond strength of at least about 12 lbs/f.

* * * * *